(12) United States Patent
Naserian et al.

(10) Patent No.: US 12,039,868 B2
(45) Date of Patent: Jul. 16, 2024

(54) CROSS-TRAFFIC WARNING SYSTEM OF A MOTOR VEHICLE

(71) Applicant: GM Global Technology Operations LLC, Detroit, MI (US)

(72) Inventors: Mohammad Naserian, Windsor (CA); Zhiqiang Deng, Shanghai (CN)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 397 days.

(21) Appl. No.: 17/560,708

(22) Filed: Dec. 23, 2021

(65) Prior Publication Data

US 2023/0196920 A1  Jun. 22, 2023

(30) Foreign Application Priority Data

Dec. 16, 2021  (CN) .......................... 202111544116.8

(51) Int. Cl.
  *G08G 1/16* (2006.01)
  *B60Q 1/50* (2006.01)
  (Continued)

(52) U.S. Cl.
  CPC ............. *G08G 1/166* (2013.01); *B60Q 1/525* (2013.01); *B60Q 9/008* (2013.01); *B60T 7/22* (2013.01);
  (Continued)

(58) Field of Classification Search
  CPC .......... B60Q 1/50; B60Q 1/525; B60Q 9/008; B60Q 2400/50; B60T 7/12; B60T 7/22; B60W 30/09; B60W 2420/403; B60W 2420/408; B60W 2554/4026; B60W 2554/4029; B60W 2554/4041;
  (Continued)

(56) References Cited

U.S. PATENT DOCUMENTS 9,239,380 B2    1/2016  Hegemann et al.
2017/0268896 A1* 9/2017 Bai ..................... G01C 21/3484
(Continued)

FOREIGN PATENT DOCUMENTS

DE    102015225410 A1    6/2017
DE    102017201538 A1    3/2018
(Continued)

*Primary Examiner* — Calvin Cheung
(74) *Attorney, Agent, or Firm* — Vivacqua Crane, PLLC

(57) ABSTRACT

A cross-traffic warning system for a motor vehicle includes first and second input devices transmitting associated first and second input signals for first and second detected objects positioned on the roadway. The system further includes a computer having one or more processors and a computer readable medium storing instructions. The processor is programmed to determine that the first object is a Vulnerable Road User ("VRU") travelling on a first path based on the first input signal. The processor is further programmed to determine that the second object is a third party vehicle and further that the VRU and the third party vehicle are travelling on an associated one of first and second paths to imminently collide with one another based on the first and second input signals. The processor is further programmed to generate an actuation signal in response to the processor determining the imminent collision.

17 Claims, 2 Drawing Sheets

(51) Int. Cl.
*B60Q 9/00* (2006.01)
*B60T 7/22* (2006.01)
*B60W 30/09* (2012.01)
*G06V 20/58* (2022.01)
*G08G 1/01* (2006.01)
*G08G 1/052* (2006.01)
*G08G 1/0967* (2006.01)

(52) U.S. Cl.
CPC ............. *B60W 30/09* (2013.01); *G06V 20/58* (2022.01); *G08G 1/0112* (2013.01); *G08G 1/052* (2013.01); *G08G 1/096725* (2013.01); *B60W 2420/403* (2013.01); *B60W 2420/408* (2024.01); *B60W 2554/4026* (2020.02); *B60W 2554/4029* (2020.02); *B60W 2554/4041* (2020.02); *B60W 2554/4042* (2020.02); *B60W 2554/4043* (2020.02)

(58) Field of Classification Search
CPC .. B60W 2554/4042; B60W 2554/4043; G06V 20/58; G06V 40/103; G08G 1/0112; G08G 1/052; G08G 1/096725; G08G 1/162; G08G 1/165; G08G 1/166
See application file for complete search history.

(56) References Cited

U.S. PATENT DOCUMENTS

| 2018/0286223 | A1* | 10/2018 | Ova | G08G 1/0129 |
| 2019/0037499 | A1* | 1/2019 | Son | G08G 1/096791 |
| 2019/0208449 | A1* | 7/2019 | Wang | H04W 4/40 |
| 2019/0287396 | A1* | 9/2019 | Sayin | G08G 1/07 |
| 2021/0063546 | A1* | 3/2021 | Slobodyanyuk | G01S 13/91 |

FOREIGN PATENT DOCUMENTS

| WO | 2007134430 A1 | 11/2007 | |
| WO | WO-2021118675 A1 * | 6/2021 | .......... B60W 30/085 |

* cited by examiner

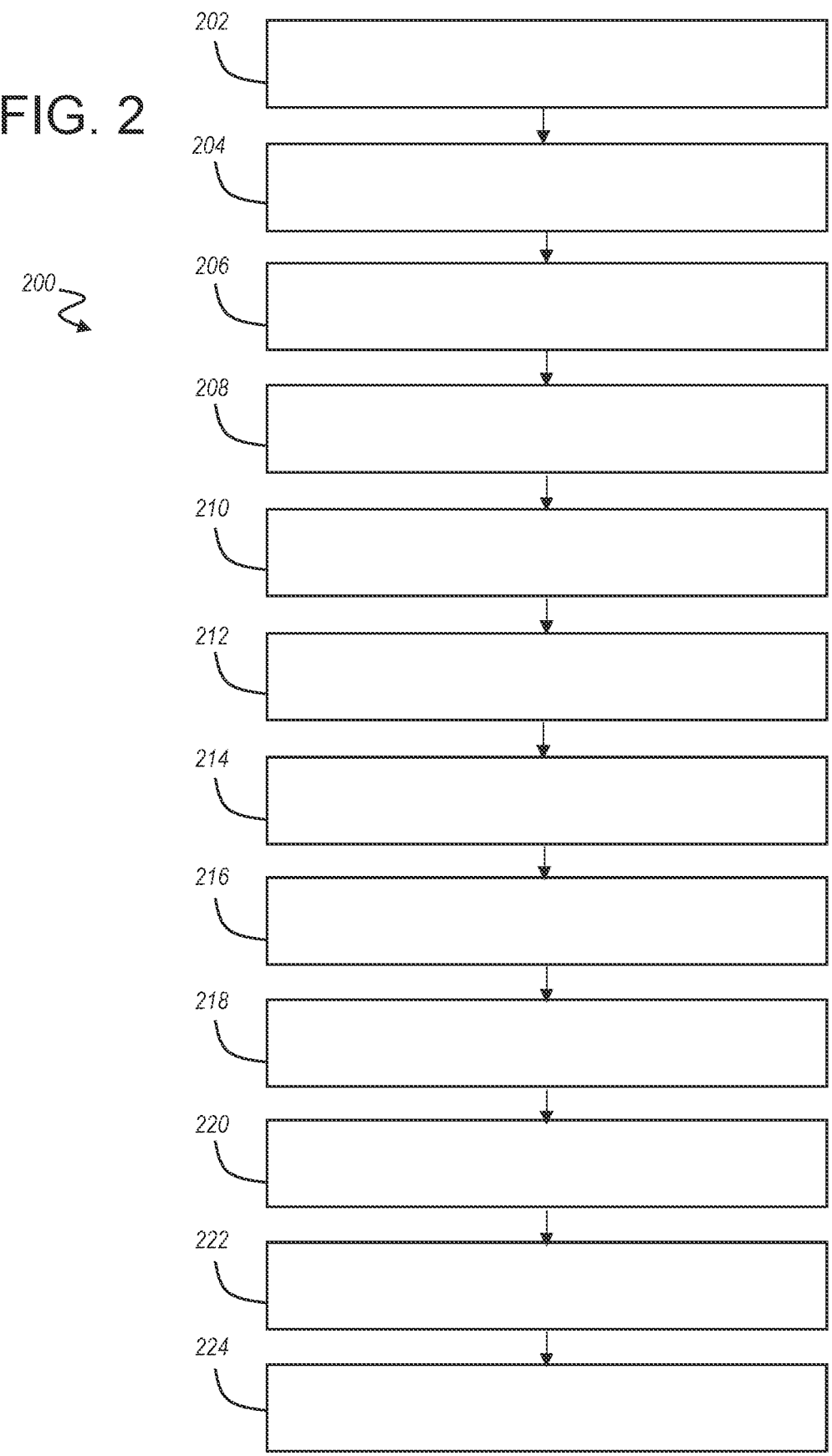

CROSS-TRAFFIC WARNING SYSTEM OF A MOTOR VEHICLE

CROSS-REFERENCE TO RELATED APPLICATION

This application claims priority to Chinese Application number 202111544116.8, filed Dec. 16, 2021. The contents of the application are incorporated herein by reference in its entirety.

INTRODUCTION

The present disclosure relates to cross-traffic warning systems of motor vehicles, and more particularly to a cross-traffic warning system of a host vehicle that indicates to a hidden Vulnerable Road User ("VRU") and/or a third party motor vehicle that a collision between the third party motor vehicle and the VRU is imminent.

Modern vehicles can include a Pedestrian Detection system ("PD system") with Automated Emergency Braking to prevent imminent collisions between the hidden VRUs and the vehicle. Examples of VRUs include individuals located on or alongside a roadway without the protective rigid covering of a metal automobile, such as a pedestrian, a roadway worker, an individual operating a wheelchair or other personal mobility device, whether motorized or not, an individual operating an electric scooter or the like, an individual operating a bicycle or other non-motorized means of transportation, and individuals operating a motorcycle. The PD system can include one or more notification devices that alert the driver of a host vehicle that a collision between a VRU and the host vehicle is imminent. The notification devices can provide a visual warning, an audible warning, or a tactile warning perceived by the driver. However, these systems do not alert third parties, e.g., third party vehicles and occupants of third party vehicles, that the third party vehicle and the VRU are travelling on respective paths path to imminently collide with one another, particularly when the host vehicle is blocking a line of sight between the third party vehicle and the VRU.

Thus, while the current PD systems achieve their intended purpose, there is a need for a new and improved cross-traffic warning system that addresses these issues.

SUMMARY

According to several aspects, a cross-traffic warning system ("system") is provided for a motor vehicle. The system includes a first input device for transmitting a first input signal associated with a first detected object positioned on a roadway. The system further includes a second input device for transmitting a second input signal associated with a second detected object positioned on the roadway. The system further includes a host computer coupled to the motor vehicle. The host computer includes one or more host processors coupled to the first and second input devices, and the host processor receives the first and second input signals from the first and second input devices. The host computer further includes a host non-transitory computer readable storage medium ("CRM") storing instructions, such that the host processor is programmed to determine that the first object is a Vulnerable Road User ("VRU") travelling on a first path based on the first input signal. The host processor is further programmed to determine that the second object is a third party vehicle and further that the VRU and the third party vehicle are travelling on an associated one of first and second paths to imminently collide with one another based on the first and second input signals. The host processor is further programmed to generate an actuation signal, in response to the host processor determining that the VRU and the third party vehicle are travelling on an associated one of first and second paths to imminently collide with one another.

In one aspect, the system further includes one or more light projectors coupled to the host processor. In response to the light projector receiving the actuation signal from the host processor, the light projector projects a light in an outboard direction from the motor vehicle to indicate to the VRU and/or the third party vehicle that the VRU and the third party vehicle are travelling on an associated one of first and second paths to imminently collide with one another.

In another aspect, the host processor generates the actuation signal, in response to the host processor determining that the VRU is not positioned within a line of sight of the third party vehicle.

In another aspect, the light projector is configured to project the light in the form of at least one of a pattern, a symbol, and a word that indicate that the VRU and the third party vehicle are travelling on an associated one of first and second paths to imminently collide with one another. The light is projected to an area within the line of sight of at least one of the third party vehicle and the VRU.

In another aspect, the second input device is a V2X module for receiving a third party vehicle signal associated with a location and a velocity of the third party vehicle.

In another aspect, the first input device includes a radar unit for generating the first input signal, where the host processor determines a location and a velocity of the first object, in response to the host processor receiving the first input signal from the radar unit. The first input device can further include a camera sensor for generating the first input signal, where the host processor determines that the first object is the VRU, in response to the host processor receiving the first input signal from the camera sensor.

In another aspect, the light projector is configured to project the light onto a portion of a roadway that is positioned adjacent to the motor vehicle and within the line of sight of the third party vehicle.

In another aspect, the local processor is further programmed to generate an output signal based on a location and a velocity of the VRU. The system further includes a remote computer having one or more remote processors receiving the output signal from the host processor. The remote computer further includes a remote non-transitory host computer readable storage medium storing instructions, such that the remote processor is programmed to determine the location and the velocity of the VRU based on the output signal. The remote processor identifies one or more local vehicles positioned within a predetermined distance from the location of the VRU. The remote processor transmits a notification signal to the local vehicle, with the notification signal based on the location and velocity of the VRU.

In another aspect, the local vehicle includes a local computer generating an activation signal, in response to the local computer receiving the notification signal from the remote computer. The local vehicle further includes a notification device for indicating the location of the VRU to an occupant of the associated local vehicle.

In another aspect, the notification device includes a display device for displaying a visible alert related to the VRU, a speaker for emitting an audible alert related to the VRU, and/or a haptic device for vibrating a component of the local vehicle.

In another aspect, the local vehicle further includes a brake module and a lateral/longitudinal control system module for actuating the brake module, in response to the lateral/longitudinal control system module receiving the activation signal from the local computer.

According to several aspects, a computer is provided for a cross-traffic warning system ("system") of a motor vehicle. The system includes a first input device for transmitting a first input signal associated with a first detected object positioned on a roadway. The system further includes a second input device for transmitting a second input signal associated with a second detected object positioned on the roadway. The system further includes one or more light projectors coupled to the host processor. The computer includes one or more host processors coupled to the first and second input devices and receiving the first and second input signals from an associated one of the first and second input devices. The computer further includes a host non-transitory computer readable storage medium storing instructions, such that the host processor is programmed to determine that the first object is a Vulnerable Road User ("VRU") travelling on a first path based on the first input signal. The host processor is further programmed to determine that the second object is a third party vehicle and further that the VRU and the third party vehicle are travelling on an associated one of first and second paths to imminently collide with one another based on the first and second input signals. The host processor is further programmed to generate an actuation signal, in response to the host processor determining that the VRU and the third party vehicle are travelling on an associated one of first and second paths to imminently collide with one another.

In one aspect, the host processor transmits the actuation signal to the light projector, such that the light projector projects a light in an outboard direction from the motor vehicle to indicate to the VRU and/or the third party vehicle that the VRU and the third party vehicle are travelling on an associated one of first and second paths to imminently collide with one another, in response to the light projector receiving the actuation signal from the host processor.

In another aspect, the host processor generates the actuation signal, in response to the host processor determining that the VRU is not positioned within a line of sight of the third party vehicle.

In another aspect, the host one processor is further programmed to generate an output signal based on a location and a velocity of the VRU, in response to a remote computer receiving the output signal. The remote computer determines the location and the velocity of the VRU based on the output signal. The remote computer further identifies one or more local vehicles within a predetermined distance from the location of the VRU. The remote computer transmits a notification signal to the local vehicle, with the notification signal based on the location and velocity of the VRU.

According to several aspects, a process is provided for operating a cross-traffic warning system ("system") of a motor vehicle. The system includes first and second input devices coupled to the motor vehicle, a host computer having one or more host processors and a host non-transitory computer readable storage medium, and one or more light projectors coupled to the host processor. The process includes transmitting, using the first input device, a first input signal associated with a first detected object positioned on a roadway. The process further includes transmitting, using the second input device, a second input signal associated with a second detected object positioned on the roadway. The process further includes determining, using the host processor, that the first object is a Vulnerable Road User ("VRU") travelling on a first path based on the first input signal. The process further includes determining, using the host processor, that the second object is a third party vehicle and further that the VRU and the third party vehicle are travelling on an associated one of first and second paths to imminently collide with one another based on the first and second input signals. The process further includes generating, using the host processor, an actuation signal, in response to the host processor determining that the VRU and the third party vehicle are travelling on an associated one of first and second paths to imminently collide with one another.

In one aspect, the process further includes projecting, using the light projector, a light in an outboard direction from the motor vehicle to indicate to the VRU and/or the third party vehicle that the VRU and the third party vehicle are travelling on an associated one of first and second paths to imminently collide with one another, in response to the light projector receiving the actuation signal from the host processor.

In another aspect, the process further includes generating, using the host processor, the actuation signal, in response to the host processor determining that the VRU is not positioned within a line of sight of the third party vehicle.

In another aspect, the process further includes receiving, using one or more remote processors of a remote computer, the output signal from the host processor. The process further includes determining, using the remote processor, the location and the velocity of the VRU based on the output signal. The process further includes identifying, using the remote processor, one or more local vehicles within a predetermined distance from the location of the VRU. The process further includes transmitting, using the remote processor, a notification signal to the local vehicle, with the notification signal based on the location and velocity of the VRU. The process further includes generating, using a local computer of the local vehicle, an activation signal in response to the local computer receiving the notification signal from the remote computer. The process further includes alerting, using a notification device of the local vehicle, an occupant of the associated local vehicle about the location of the VRU.

In another aspect, the process further includes displaying, using a display device of the local vehicle, a visible alert related to the VRU. The process further includes emitting, using a speaker of the local vehicle, an audible alert related to the VRU. The process further includes vibrating, using a haptic device of the local vehicle, a component of the local vehicle. The process further includes actuating, using a brake module and a lateral/longitudinal control system module of the local vehicle, the brake module, in response to the lateral/longitudinal control system module receiving the activation signal from the local computer.

Further areas of applicability will become apparent from the description provided herein. It should be understood that the description and specific examples are intended for purposes of illustration only and are not intended to limit the scope of the present disclosure.

BRIEF DESCRIPTION OF THE DRAWINGS

FIG. 2 is a flow chart of one non-limiting example of a process for operating the system of FIG. 1.

DETAILED DESCRIPTION

Figure 1:
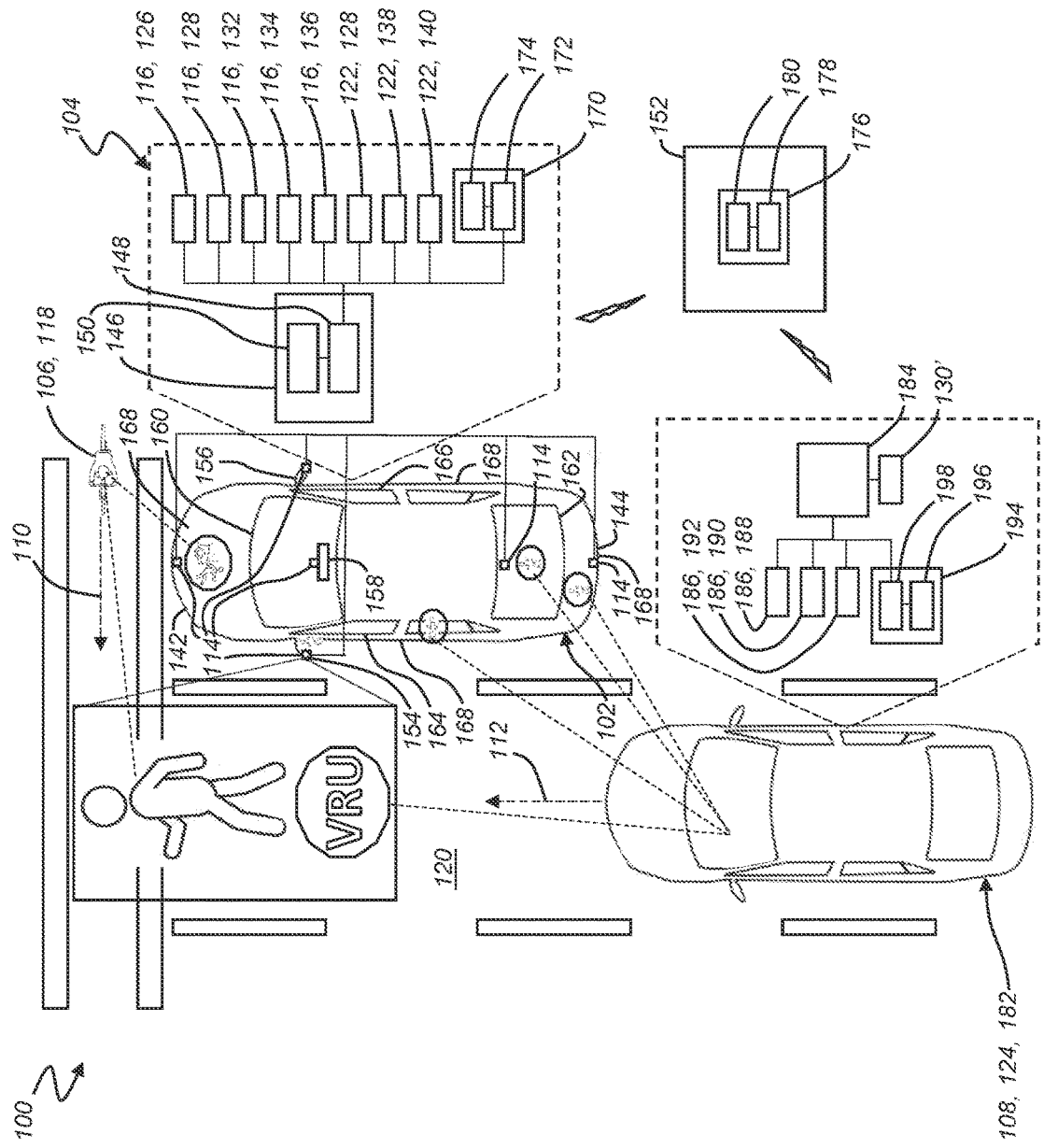
FIG. 1 is a schematic view of one non-limiting example of a network including a motor vehicle having a cross-traffic warning system for indicating to a hidden Vulnerable Road User ("VRU") and/or a third party vehicle that the VRU and the third party vehicle are travelling on an associated one of first and second paths to imminently collide with one another.

The following description is merely exemplary in nature and is not intended to limit the present disclosure, application, or uses.

Referring to FIG. 1, there is generally illustrated one example of a network 100 including a motor vehicle 102 having a cross-traffic warning system 104 ("system") for indicating to a hidden Vulnerable Road User 106 ("VRU") and/or a third party vehicle 108 that the hidden VRU 106 and the third party vehicle 108 are travelling on an associated one of first and second paths 110, 112 to imminently collide with one another. In one non-limiting example, the motor vehicle 102 includes a light projector 114 for projecting a light that is detected or perceived by the third party vehicle 108 or its occupant to indicate the presence of the hidden VRU 106. In another non-limiting example, the system 104 transmits data to an Advanced Driver Assist System ("ADAS") of the third party vehicle 108, such that the third party vehicle 108 can notify its occupant and/or apply automated emergency braking. Non-limiting examples of the VRUs can include individuals located on or alongside a roadway without the protective rigid covering of a metal automobile, such as a pedestrian, a roadway worker, an individual operating a wheelchair or other personal mobility device, whether motorized or not, an individual operating an electric scooter or the like, an individual operating a bicycle or other non-motorized means of transportation, and individuals operating a motorcycle.

The system 104 includes a first input device 116 for transmitting a first input signal associated with a first detected object 118 positioned on a roadway 120 and a second input device 122 for transmitting a second input signal associated with a second detected object 124 positioned on the roadway 120. The first input device 116 can include the radar unit 126 and/or the camera sensor 128 generating the first input signal, and the second input device 122 can include a V2X module 130 generating the second input signal in response to the second input device 122 receiving data from adjacent roadway infrastructure, third party vehicles 108, or a remote computer 176. Non-limiting examples of the first and/or second input devices 116, 122 can include one or more short range radar sensors 132, Light Detection and Ranging sensors 134 (LiDAR sensor"), Millimeter-Wave Radar sensors 136 ("MWR sensors"), infrared cameras 138, stereo vision camera sensors 140, and/or other suitable sensors mounted to a front end structure 142 of the motor vehicle 102, a rear end structure 144 of the motor vehicle 102, or other suitable portions of the motor vehicle 102. Specifically, the second input device 122 can include the V2X module 130 for receiving a third party vehicle signal associated with a location and a velocity of the third party vehicle 108. Each one of the first and second input devices 116, 122 can be stand-alone devices mounted to the motor vehicle 102 or integral components of other systems, e.g., a Forward Collision Mitigation system 170 ("FCM system"). It is contemplated that fusion of data from multiple different sensors can bring redundancy and complementary characteristics of sensors for improving the reliability and accuracy of the sensors.

The system 104 further includes a host computer 146 coupled to the motor vehicle 102. In one non-limiting example, the host computer 146 can be an External Object Calculating Module ("EOCM"), which is a central computer for two or more vehicle safety systems. In another non-limiting example, the system 104 can include a Controller Area Network ("CAN bus") for allowing multiple microcontrollers and devices of other systems, e.g., the FCM system 170 and others, to communicate with the applications of one another without the dedicated host computer 146. In the present example, the host computer 146 includes one or more host processors 148 coupled to the first and second input devices 116, 122. The host processor 148 receives the first and second input signals from an associated one of the first and second input devices 116, 122.

The host computer 146 further includes a host non-transitory computer readable storage medium 150 ("host CRM") storing instructions, such that the host processor 148 is programmed to determine that the first detected object 118 is a Vulnerable Road User ("VRU") travelling on a first path, in response to the host processor receiving the first input signal from the first input device 116, e.g., the camera sensor 128. The host processor 148 further determines a location and a velocity of the first detected object 118, in response to the host processor 148 receiving the first input signal from the first input device 116, e.g., the radar unit 126. In one non-limiting example, the host processor 148 can be programmed to utilize any suitable Deep Neural Network ("DNN"), e.g., a Convolutional Neural Network ("CNN"), to determine that the detected first detected object 118 is a Vulnerable Road User ("VRU") travelling on a first path 110 based on the first input signal. In addition, the host processor 148 is further programmed to determine that the second detected object 112 is a third party vehicle 108 and further that the VRU 106 and the third party vehicle 108 are travelling on an associated one of first and second paths 110, 112 to imminently collide with one another, in response to the host processor 148 receiving first input signal from the first input device 116 and the second input signal from the second input device 122, e.g., the radar unit 126 and/or the V2X module 130. The host processor 148 is further programmed to generate an actuation signal, in response to the host processor 148 determining that the VRU 106 and the third party vehicle 108 are travelling on an associated one of first and second paths 110, 112 to imminently collide with one another. The host processor 148 generates the actuation signal, in further response to the host processor 148 determining that the VRU 106 is not positioned within a line of sight of the third party vehicle 108. As described in detail below, the host processor 148 generates an output signal based on the location and the velocity of the VRU 106 for indicating to the imminent collision to nearby local vehicles via a centralized data center 152.

The system 104 further includes one or more light projectors 114 coupled to the host processor 148, with the light projector 114 projecting a light in an outboard direction from the motor vehicle 102 to indicate to the hidden VRU 106 and/or the third party vehicle 108 that the VRU 106 and the third party vehicle 108 are travelling on an associated one of first and second paths to imminently collide with one another, in response to the light projector 114 receiving the actuation signal from the host processor 148. The light projector 114 can be mounted to mounted to one or both side view mirrors 154, 156, a rear view mirror assembly 158, the front end structure 142, the rear end structure 144, or other suitable portions of the motor vehicle 102. In one non-limiting example, the light projector 114 is configured to project the light onto a portion of a roadway 120 that is positioned adjacent to the motor vehicle 102 and within the line of sight of the third party vehicle 108. The light projector 114 is configured to project the light in the form of at least one of a pattern, a symbol, and a word that indicate to the VRU 106 and/or the third party vehicle 108 that the VRU 106 and the third party vehicle 108 are travelling on an associated one of first and second paths to imminently collide with one another, with the light being within the line of sight of the third party vehicle 108 and/or the VRU 106. As but on example, two light projectors can be attached to an associated one of a driver-side sideview mirror assembly 154 and a passenger-side sideview mirror assembly 156 for illuminating. with or without a strobe effect, the term "VRU" on a portion of the roadway surface that is within the line of sight of both the third party vehicle 108 and the VRU 106. In other examples, the light projector can be configured to project the light onto a screen attached to a front windshield 160, a rear windshield 162, driver side window 164, a passenger side window 166, an outboard facing surface of any body panel 168, or directly toward an occupant of the third party vehicle.

The system 104 further includes the Forward Collision Mitigation module 170 ("FCM module") coupled to the host processor 148. The FCM module 170 can include a brake module 172 and a lateral/longitudinal control system module 174 for actuating the brake module 172, in response to the FCM module 170 receiving a third party vehicle signal from the V2X module 130 when the VRU 106 and the third party vehicle 108 are travelling along an associated one of first and second paths 110, 112 such that the VRU 106 and the third party vehicle 108 can imminently collide with one another, as described in detail below.

The network 100 further includes the centralized cloud data center 152 having a remote computer 176 with one or more remote processors 178 receiving the output signal from the host processor 148. The remote computer 176 further includes a remote non-transitory host computer readable storage medium 180 ("CRM") storing instructions, such that the remote processor 178 is programmed to determine the location and the velocity of the VRU 106 based on the output signal. The remote processor 178 further identifies one or more local vehicles 182 within a predetermined distance from the location of the VRU 106 and the third party vehicle 108 based on local motor vehicle signals received from the local vehicles 182. The remote processor 178 further transmits a notification signal to the local vehicle 182, with the notification signal based on the location and the velocity of the VRU 106.

In this non-limiting example, the local vehicle 182 includes a local computer 184, which is similar to the host computer 146 of the host vehicle 102 and is coupled to a V2X module 130' for receiving data from adjacent roadway infrastructure, other motor vehicles, or the remote computer 176 of the centralized data center 152. The local computer 184 generates an activation signal, in response to the local computer 184 receiving the notification signal from the remote computer 176. The local vehicle 182 further includes a notification device 186 for indicating the location of the VRU 106 to an occupant of the associated local vehicle 182. The notification device can include one or more HMIs, including a display device 188 for displaying a visible alert related to the VRU 106, a speaker 190 for emitting an audible alert related to the VRU 106, and a haptic device 192 for vibrating a component of the local vehicle 182. The local vehicle 182 can further includes a FCM module 194 with a brake module 196 and a lateral/longitudinal control system module 198 for actuating the brake module 196, in response to the lateral/longitudinal control system module 198 receiving the activation signal from the local computer 184.

Referring to FIG. 2, one non-limiting example of a process 200 is provided for operating the cross-traffic warning system 104 of the motor vehicle 102. The process 200 begins at block 202 with transmitting, using the first input device 116, the first input signal associated with the first detected object 118 positioned on the roadway and transmitting, using the second input device 122, a second input signal associated with a second detected object 124 positioned on the roadway 120. In one non-limiting example, the first input device 116 can include camera sensor 128 and the radar unit 126.

At block 204, the process 200 further includes determining, using the host processor 148, that the first detected object 118 is the VRU 106 travelling on the first path 110 and further determining the location and the velocity of the VRU 106, in response to the host processor 148 receiving the first input signal from the first input device, e.g., the camera sensor 128 and the radar unit 126.

At block 206, the process 200 further includes determining, using the host processor 148, that the second detected object 112 is a third party vehicle 108 and further that the VRU 106 and the third party vehicle 108 are travelling on an associated one of first and second paths 110, 112 to imminently collide with one another based on the first and second input signals. Continuing with the previous example, the host processor 148 determines that the VRU 106 and the third party vehicle 108 are travelling on an associated one of first and second paths 110, 112 to imminently collide with one another, in response to the host processor 148 receiving the first input signals from the camera sensor 128 and the radar unit 126. The host processor 148 further determines that the location and the velocity of the VRU 106, in response to the host processor 148 receiving the second input signal from the radar unit 126 and/or the V2X module 130.

At block 208, the process 200 further includes generating, using the host processor 148, an actuation signal in response to the host processor 148 determining that the VRU 106 and the third party vehicle 108 are travelling on an associated one of first and second paths 110, 112 to imminently collide with one another.

At block 210, the process 200 further includes projecting, using the light projector 114, a light in an outboard direction from the motor vehicle 102 to indicate to the hidden VRU 106 and/or the third party vehicle 108 that the VRU 106 and the third party vehicle 108 are travelling on an associated one of first and second paths to imminently collide with one another, in response to the light projector 114 receiving the actuation signal from the host processor 148. The process 200 further includes generating, using the host processor 148, the actuation signal, in response to the host processor 148 determining that the VRU 106 is not positioned within a line of sight of the third party vehicle.

At block 212, the process 200 further includes receiving, using the remote processor 178 of the remote computer 176, the output signal from the host processor 148.

At block 214, the process 200 further includes determining, using the remote processor 178, the location and the velocity of the VRU 106 based on the output signal.

At block 216, the process 200 further includes identifying, using the remote processor 178, one or more local vehicles 182 within a predetermined distance from the location of the VRU 106, in response to the remote processor 178 receiving the output signal from the host processor 148 and local vehicle signals from the local vehicles 182.

At block 218, the process 200 further includes transmitting, using the remote processor 178, a notification signal to the local vehicle 182, with the notification signal based on the location and velocity of the VRU 106.

At block 220, the process 200 further includes generating, using the local computer 184 of the local vehicle 182, an activation signal in response to the local computer 184 receiving the notification signal from the remote computer 176.

At block 222, the process 200 further includes alerting, using the notification device 186 of the local vehicle 182, an occupant of the associated local vehicle 182 about the location of the VRU 106. In one non-limiting example, this step can be accomplished by displaying, using the display device of the local vehicle 182, the visible alert related to the VRU 106. In another non-limiting example, this step can be accomplished by emitting, using the speaker 190 of the local vehicle 182, an audible alert related to the VRU 106. In still another non-limiting example, this step can be accomplished by vibrating, using the haptic device 192 of the local vehicle 182, a component of the local vehicle 182.

At block 224, the process 200 further includes actuating, using the lateral/longitudinal control system module 198 of the local vehicle 182, the brake module 196, in response to the lateral/longitudinal control system module 198 receiving the activation signal from the local computer 184.

In general, the computing systems and/or devices described may employ any of a number of computer operating systems, including, but by no means limited to, versions and/or varieties of the ANDROID AUTOMOTIVE OS developed by GOOGLE INC., the MICROSOFT WINDOWS operating system, the UNIX operating system (e.g., the SOLARIS operating system distributed by ORACLE Corporation of Redwood Shores, California), the AIX UNIX operating system distributed by INTERNATIONAL BUSINESS MACHINES of Armonk, New York, the LINUX operating system, the MAC OSX and iOS operating systems distributed by APPLE INC. of Cupertino, California, the BLACKBERRY OS distributed by BLACKBERRY LTD. of Waterloo, Canada, and the OPEN HANDSET ALLIANCE, or the QNX CAR Platform for Infotainment offered by QNX Software Systems. Examples of computing devices include, without limitation, an on board vehicle computer, a computer workstation, a server, a desktop, notebook, laptop, or handheld computer, or some other computing system and/or device.

Computers and computing devices generally include computer executable instructions, where the instructions may be executable by one or more computing devices such as those listed above. Computer executable instructions may be compiled or interpreted from computer programs created using a variety of programming languages and/or technologies, including, without limitation, and either alone or in combination, JAVA, C, C++, MATLAB, SIMULINK, STATEFLOW, VISUAL BASIC, JAVA SCRIPT, PERL, HTML, TENSORFLOW, PYTORCH, KERAS, etc. Some of these applications may be compiled and executed on a virtual machine, such as the JAVA VIRTUAL MACHINE, the DALVIK virtual machine, or the like. In general, a processor (e.g., a microprocessor) receives instructions, e.g., from a memory, a computer readable medium, etc., and executes these instructions, thereby performing one or more processes, including one or more of the processes described herein. Such instructions and other data may be stored and transmitted using a variety of computer readable media. A file in a computing device is generally a collection of data stored on a computer readable medium, such as a storage medium, a random-access memory, etc.

The CRM that participates in providing data (e.g., instructions) may be read by the computer (e.g., by a processor of a computer and may take many forms, including, but not limited to, non-volatile media and volatile media. Non-volatile media may include, for example, optical or magnetic disks and other persistent memory. Volatile media may include, for example, dynamic random-access memory (DRAM), which typically constitutes a main memory. Such instructions may be transmitted by one or more transmission media, including coaxial cables, copper wire and fiber optics, including the wires that comprise a system bus coupled to a processor of an ECU. Common forms of computer readable media include, for example, a floppy disk, a flexible disk, hard disk, magnetic tape, any other magnetic medium, a CD ROM, DVD, any other optical medium, punch cards, paper tape, any other physical medium with patterns of holes, a RAM, a PROM, an EPROM, a FLASH EEPROM, any other memory chip or cartridge, or any other medium from which a computer can read.

Databases, data repositories or other data stores described herein may include various kinds of mechanisms for storing, accessing, and retrieving various kinds of data, including a hierarchical database, a set of files in a file system, an application database in a proprietary format, a relational database management system (RDBMS), etc. Each such data store is generally included within a computing device employing a computer operating system such as one of those mentioned above, and are accessed via a network in any one or more of a variety of manners. A file system may be accessible from a computer operating system, and may include files stored in various formats. An RDBMS generally employs the Structured Query Language (SQL) in addition to a language for creating, storing, editing, and executing stored procedures, such as the PL/SQL language mentioned above.

In some examples, system elements may be implemented as computer readable instructions (e.g., software) on one or more computing devices (e.g., servers, personal computers, etc.), stored on computer readable media associated therewith (e.g., disks, memories, etc.). A computer program product may comprise such instructions stored on computer readable media for carrying out the functions described herein.

With regard to the media, processes, systems, methods, heuristics, etc. described herein, it should be understood that, although the steps of such processes, etc. have been described as occurring according to a certain ordered sequence, such processes may be practiced with the described steps performed in an order other than the order described herein. It further should be understood that certain steps may be performed simultaneously, that other steps may be added, or that certain steps described herein may be omitted. In other words, the descriptions of processes herein are provided for the purpose of illustrating certain embodiments, and should in no way be construed so as to limit the claims.

Accordingly, it is to be understood that the above description is intended to be illustrative and not restrictive. Many embodiments and applications other than the examples provided would be apparent to those of skill in the art upon reading the above description. The scope of the invention should be determined, not with reference to the above description, but should instead be determined with reference to the appended claims, along with the full scope of equivalents to which such claims are entitled. It is anticipated and intended that future developments will occur in the arts discussed herein, and that the disclosed systems and methods will be incorporated into such future embodiments. In sum, it should be understood that the invention is capable of modification and variation and is limited only by the following claims.

All terms used in the claims are intended to be given their plain and ordinary meanings as understood by those skilled in the art unless an explicit indication to the contrary in made herein. In particular, use of the singular articles such as "a," "the," "said," etc. should be read to recite one or more of the indicated elements unless a claim recites an explicit limitation to the contrary.

The description of the present disclosure is merely exemplary in nature and variations that do not depart from the gist of the present disclosure are intended to be within the scope of the present disclosure. Such variations are not to be regarded as a departure from the spirit and scope of the present disclosure.

What is claimed is:

1. A cross-traffic warning system for a motor vehicle, the cross-traffic warning system comprising:
    a first input device for transmitting a first input signal associated with a first detected object positioned on a roadway;
    a second input device for transmitting a second input signal associated with a second detected object positioned on the roadway;
    at least one light projector coupled to the motor vehicle; and
    a host computer coupled to the motor vehicle and comprising:
        at least one host processor coupled to the light projector, the first input device, and the second input device and receiving the first and second input signals from an associated one of the first and second input devices; and
        a host non-transitory computer readable storage medium storing instructions, such that the at least one host processor is programmed to:
            determine that the first detected object is a Vulnerable Road User ("VRU") travelling on a first path based on the first input signal;
            determine that the second detected object is a third party vehicle and further that the VRU and the third party vehicle are travelling on an associated one of first and second paths to imminently collide with one another based on the first and second input signals; and
            generate an actuation signal in response to the at least one host processor determining that the VRU and the third party vehicle are travelling on an associated one of first and second paths to imminently collide with one another,
    wherein the at least one light projector is configured to project a light in an outboard direction from the motor vehicle to indicate to at least one of the VRU and the third party vehicle that the VRU and the third party vehicle are travelling on an associated one of first and second paths to imminently collide with one another, in response to the at least one light projector receiving the actuation signal from the at least one host processor.

2. The cross-traffic warning system of claim 1 wherein the at least one host processor generates the actuation signal in response to the at least one host processor determining that the VRU is not positioned within a line of sight of the third party vehicle.

3. The cross-traffic warning system of claim 2 wherein the at least one light projector is configured to project the light in the form of at least one of a pattern, a symbol, and a word that indicate the cross-traffic condition, with the light being within the line of sight of the third party vehicle.

4. The cross-traffic warning system of claim 3 wherein the second input device comprises a V2X module for receiving a third party vehicle signal associated with a location and a velocity of the third party vehicle.

5. The cross-traffic warning system of claim 3 wherein the first input device comprises at least one of:
    a radar unit generating the first input signal, where the at least one host processor determines a location and a velocity of the first object in response to the at least one host processor receiving the first input signal; and
    a camera sensor generating the first input signal, where the at least one host processor determines that the second object is the VRU in response to the at least one host processor receiving the first and second input signals.

6. The cross-traffic warning system of claim 3 wherein the at least one light projector is configured to project the light onto a portion of a roadway that is positioned adjacent to the motor vehicle and within the line of sight of the third party vehicle.

7. The cross-traffic warning system of claim 3 wherein the at least one host processor is further programmed to generate an output signal based on a location and a velocity of the VRU, and the cross-traffic warning system further comprises:
    a remote computer comprising:
        at least one remote processor receiving the output signal from the at least one host processor; and
        a remote non-transitory host computer readable storage medium storing instructions, such that the at least one remote processor is programmed to:
            determine the location and the velocity of the VRU based on the output signal;
            identify at least one local vehicle within a predetermined distance from the location of the VRU; and
            transmit a notification signal to the at least one local vehicle, with the notification signal based on the location and velocity of the VRU.

8. The cross-traffic warning system of claim 7 wherein the at least one local vehicle comprises:
    a local computer generating an activation signal in response to the local computer receiving the notification signal from the remote computer; and
    a notification device for indicating the location of the VRU to an occupant of the associated local vehicle.

9. The cross-traffic warning system of claim 8 wherein the notification device includes at least one of a display device for displaying a visible alert related to the VRU, a speaker for emitting an audible alert related to the VRU, and a haptic device.

10. The cross-traffic warning system of claim 9, wherein the at least one local vehicle further includes a brake module and a lateral/longitudinal control system module for actuating the brake module in response to the lateral/longitudinal control system module receiving the activation signal from the local computer.

11. A computer for a cross-traffic warning system of a motor vehicle, the cross-traffic warning system including a first input device for transmitting a first input signal associated with a first detected object positioned on a roadway, the cross-traffic warning system further including a second input device for transmitting a second input signal associated with a second detected object positioned on the roadway, the cross-traffic warning system further including at least one light projector coupled to the at least one host processor, the computer comprising:
- at least one host processor coupled to the first and second input devices and receiving the first and second input signals from an associated one of the first and second input devices; and
- a host non-transitory computer readable storage medium storing instructions, such that the at least one host processor is programmed to:
  - determine that the first detected object is a Vulnerable Road User ("VRU") travelling on a first path based on the first input signal;
  - determine that the second detected object is a third party vehicle and further that the VRU and the third party vehicle are travelling on an associated one of first and second paths to imminently collide with one another based on the first and second input signals;
  - generate an actuation signal in response to the at least one host processor determining that the VRU and the third party vehicle are travelling on an associated one of first and second paths to imminently collide with one another, and
  - transmit the actuation signal to the at least one light projector, such that the at least one light projector projects a light in an outboard direction from the motor vehicle to indicate to at least one of the VRU and the third party vehicle that the VRU and the third party vehicle are travelling on an associated one of first and second paths to imminently collide with one another, in response to the at least one light projector receiving the actuation signal from the at least one host processor.

12. The computer of claim 11, wherein the at least one host processor generates the actuation signal in response to the at least one host processor determining that the VRU is not positioned within a line of sight of the third party vehicle.

13. The computer of claim 12, wherein the at least host one processor is further programmed to:
- generate an output signal based on a location and a velocity of the VRU, in response to a remote computer receiving the output signal from the remote computer:
- determine the location and the velocity of the VRU based on the output signal;
- identify at least one local vehicle within a predetermined distance from the location of the VRU; and
- transmit a notification signal to the at least one local vehicle, with the notification signal based on the location and velocity of the VRU.

14. A process for operating a cross-traffic warning system of a motor vehicle, the cross-traffic warning system including first and second input devices coupled to the motor vehicle, a host computer having at least one processor and a non-transitory computer readable storage medium, and at least one light projector coupled to the at least one host processor, the process comprising:
- transmitting, using the first input device, a first input signal associated with a first detected object positioned on a roadway;
- transmitting, using the second input device, a second input signal associated with a second detected object positioned on the roadway;
- determining, using the at least one host processor, that the first detected object is a Vulnerable Road User ("VRU") travelling on a first path based on the first input signal;
- determining, using the at least one host processor, that the second detected object is a third party vehicle and further that the VRU and the third party vehicle are travelling on an associated one of first and second paths to imminently collide with one another based on the first and second input signals;
- generating, using the at least one host processor, an actuation signal in response to the at least one host processor determining that the VRU and the third party vehicle are travelling on an associated one of first and second paths to imminently collide with one another; and
- projecting, using the at least one light projector, a light in an outboard direction from the motor vehicle to indicate to at least one of the VRU and the third party vehicle that the VRU and the third party vehicle are travelling on an associated one of first and second paths to imminently collide with one another, in response to the at least one light projector receiving the actuation signal from the at least one host processor.

15. The process of claim 14, further comprising generating, using the at least one host processor, the actuation signal in response to the at least one host processor determining that the VRU is not positioned within a line of sight of the third party vehicle.

16. The process of claim 15, further comprising:
- receiving, using at least one remote processor of a remote computer, the output signal from the at least one host processor;
- determining, using the at least one remote processor, the location and the velocity of the VRU based on the output signal;
- identifying, using the at least one remote processor, at least one local vehicle within a predetermined distance from the location of the VRU;
- transmitting, using the at least one remote processor, a notification signal to the at least one local vehicle, with the notification signal based on the location and velocity of the VRU;
- generating, using a local computer of the at least one local vehicle, an activation signal in response to the local computer receiving the notification signal from the remote computer; and
- alerting, using a notification device of the at least one local vehicle, an occupant of the associated local vehicle about the location of the VRU.

17. The process of claim 16, further comprising at least one of:
- displaying, using a display device of the at least one local vehicle, a visible alert related to the VRU;
- emitting, using a speaker of the at least one local vehicle, an audible alert related to the VRU;
- vibrating, using a haptic device of the at least one local vehicle, a component of the at least one local vehicle;
- actuating, using a brake module and a lateral/longitudinal control system module of the at least one local vehicle, the brake module in response to the lateral/longitudinal control system module receiving the activation signal from the local computer.

* * * * *